United States Patent [19]

Gebelius

[11] Patent Number: 4,784,029
[45] Date of Patent: Nov. 15, 1988

[54] SAWING METHOD, AND A DEVICE FOR UTILIZATION OF THE METHOD

[76] Inventor: Sven R. V. Gebelius, P.O. Box 15008, Bromma, Sweden, S-161 15

[21] Appl. No.: 945,872
[22] PCT Filed: Apr. 1, 1986
[86] PCT No.: PCT/SE86/00148
§ 371 Date: Dec. 1, 1986
§ 102(e) Date: Dec. 1, 1986
[87] PCT Pub. No.: WO86/05727
PCT Pub. Date: Oct. 9, 1986

[30] Foreign Application Priority Data

Apr. 2, 1985 [SE] Sweden .............. 8501638

[51] Int. Cl.$^4$ .............................. B23D 59/00
[52] U.S. Cl. .......................... 83/13; 83/169;
83/171; 83/469; 83/594; 83/676; 83/792;
83/835; 30/369
[58] Field of Search ............... 83/594, 792, 13, 169,
83/171, 168, 469, 701, 676, 835; 30/369

[56] References Cited

U.S. PATENT DOCUMENTS

| 197,650 | 11/1877 | Milligan | 83/171 |
| 822,056 | 5/1906 | Knox | 83/792 |
| 963,520 | 7/1910 | Costello | 30/369 |
| 1,188,732 | 6/1916 | Childs . | |
| 1,827,490 | 10/1931 | Spencer | 83/792 |
| 2,415,877 | 2/1947 | Hajek | 30/369 |
| 2,628,644 | 2/1953 | Elbon | 83/792 |
| 3,225,801 | 12/1965 | Dunn et al. | 83/169 |
| 3,595,455 | 7/1971 | Pace | 83/13 |
| 4,333,371 | 6/1982 | Matsuda | 83/171 |

FOREIGN PATENT DOCUMENTS 2446441 4/1975 Fed. Rep. of Germany .
3023837 1/1987 Fed. Rep. of Germany .

Primary Examiner—E. R. Kazenske
Assistant Examiner—Eugenia A. Jones
Attorney, Agent, or Firm—Holman & Stern

[57] ABSTRACT

A sawing method involving in one direction continuously driven saw blades (1, 2) or saw wheels, according to which two saw blades (1, 2) or saw wheels are arranged in an adjacent position to each other, with associated saw teeths extending in an opposed relationship to each other. The saw blades (1, 2) or the saw wheels are thereafter caused to perform a continuous movement in opposite directions to each other in the operative direction for each saw blade (1, 2) or saw wheel, whereby same in a common and co-acting operation take up a saw cut in a workpiece. In order to maintain the saw teeths of the saw blades (1, 2) or the saw wheels separated from each other during a sawing operation, a pneumatical or hydraulical medium under pressure is advantageously supplied against the adjacently located surfaces of the saw blades (1, 2) or the saw wheels during the sawing operation.

13 Claims, 2 Drawing Sheets

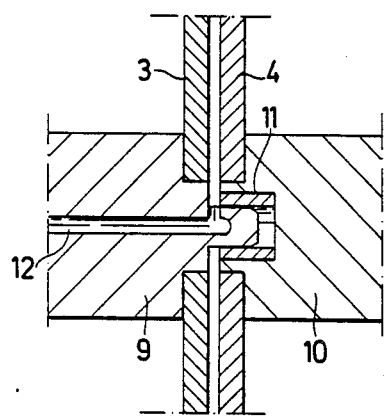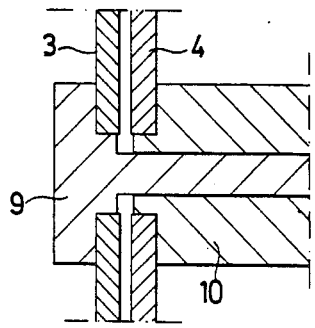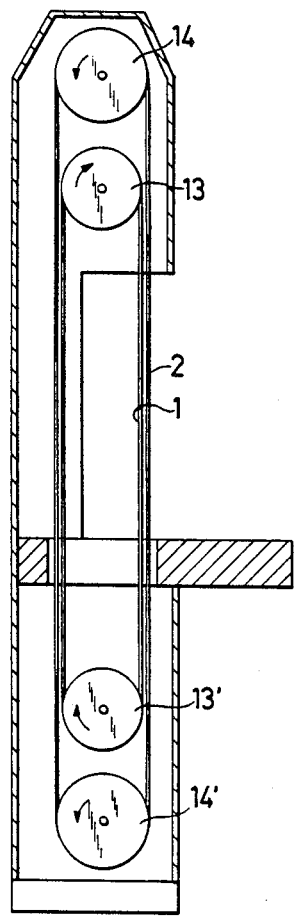

SAWING METHOD, AND A DEVICE FOR UTILIZATION OF THE METHOD

CROSS REFERENCE TO RELATED APPLICATIONS

This U.S. application stems from PCT International Application No. PCT/SE86/00148filed Apr. 1, 1986.

The present invention relates to a sawing method, and a device for utilization of the method.

It is previously known to cut various types of workpieces with saws including a saw blade having a continous linear movement, such as a bandsaw, and with saw wheels having a continous rotary movement, such as rotary saws. These previously known sawing methods are particularly well suited for workpieces having a solid cross-section, but may also be used for tubular or profiled workpieces of a material and with a wall thickness adapted to resist the plastical deformation imposed by the forces applied during a sawing operation. Sawing of workpieces, which are deformed by the forces applied by a saw blade or saw wheel, may be carried out if the sawing operation is performed using a supporting part, and for example, a thin-walled tube can be sawn by arranging a wooden stave having a diameter corresponding to the internal diameter of the tube located embraced by the tube at the point where the sawing operation is about to take place, but the supporting part will also be sawn off at the same time. For certain applications, rotary wheels, coated with a grinding material, are utilized as replacement for a saw wheel, and the workpiece is thus cut by means of a grinding cutting operation, which results in a high temperature during the operation, and formation of scale and burrs, and thus also normally a subsequently following operation in order to receive an acceptable cut surface. Furthermore, such a cutting grinding operation requires that the workpiece has necessary resistance against plastical deformation, since cutting by means of a grinding method results in application of relatively large deforming forces on the workpiece.

The object of the present invention is to disclose a previously unknown sawing method, which facilitates sawing of extremely thin-walled workpieces with a minimum of plastical deformation, and also sawing of thin-walled tubes and profiled workpieces without any supporting parts of previously mentioned type being required. The method according to the invention makes it further possible to achieve an extremely favourable cut surface, which only rarely requires further machining by deburring, and the risk for a saw wheel or blade to "seize" the workpiece, and thus result in throwing and risk for injuries on the operator, is also eliminated. The present invention also relates to a device for utilization of the method.

The method according to the present invention is mainly characterised in that two saw blades or saw wheels are arranged located in an adjacent relationship to each other with the operative direction for associated saw teeths in an opposed relationship to each other, and that each saw blade or saw wheel is caused to perform a continous movement in opposite directions to each other in the operative direction for each saw blade or saw wheel, and that the saw blades or the saw wheels in a common an co-acting operation take up a saw cut in a workpiece.

The present invention is more fully described below with reference to the accompanying drawings, in which:

FIG. 5 shows a first embodiment with regard to how two saw wheels can be arranged supported by means of two in opposite directions in relation to each other revolving drive shafts.

FIG. 6 shows a second embodiment with regard to how two saw wheels can be arranged supported by means of two in opposite directions in relation to each other revolving drive shafts.

FIG. 7 shows a diagrammatical example of how a band saw can be arranged to be utilized in accordance with the invention.

Figure 1:
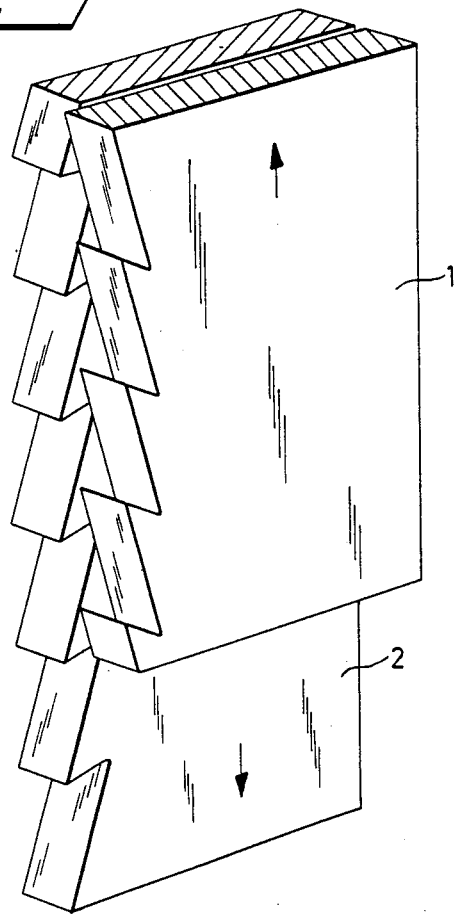
FIG. 1 shows two portions of two each other adjacently located saw blades, intended to perform a continous movement in two opposed directions in relation to each other, as indicated by arrows.

With reference to FIG. 1, it is shown how a first saw blade 1 is arranged to perform a sawing operation during an upwardly directed movement, and how a second saw blade 2, located behind the first, is arranged to perform a corresponding operation during a downwardly directed movement. The first and the second saw blade, 1 and 2 respectively, are arranged located adjacently to each other, and are driven continously in the directions indicated by arrows, i.e. in an opposed relationship to each other.

Figure 2:
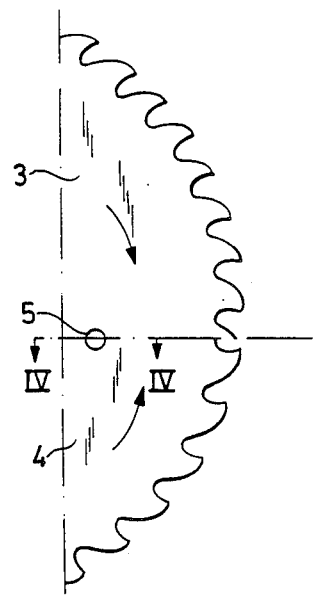
FIG. 2 show portions of two each other adjacently located saw wheels, intended to perform a continous and in relation to each other opposed rotary movement.

A corresponding operation can also be accomplished using circular saw wheels, as indicated in FIG. 2, in which two saw wheels 3, 4 are located in an adjacent relationship to each other, having associated saw teeths extending in an opposed relationship to each other. In order to simplify the drawing, only part of the saw wheels 3, 4 are shown, i.e. with a first saw wheel 3 indicated in the upper portion of the figure, and with a second saw wheel 4, located behind the first, indicated in the lower portion of the figure. The saw wheels 3, 4 are advantageously arranged with a number of peripherally located holes 5, which will be further discussed later.

Figure 3:
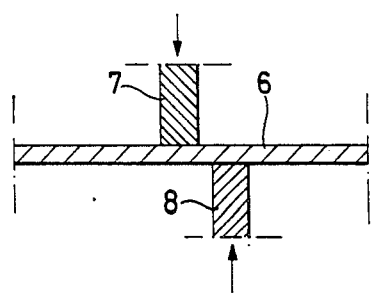
FIG. 3 shows an example of how two saw teeths take up contact with a workpiece.

The method in which the saw teeths of two saw blades 1, 2, or two saw wheels 3, 4, take up contact with a workpiece 6, is exemplified schematically in FIG. 3, disclosing how two saw teeths 7, 8 in an adjacently located relationship to each other, and performing an opposed movement in relation to each other, impose a substantially equal and opposed application of force against a workpiece. The opposed movement of the saw teeths 7, 8 in relation to each other results in that they also serve as supporting means for the workpiece 6, and due to the immediate closeness of the saw teeths 7, 8 in relation to each other, no noticable deformation of the workpiece will occur, and an extremely smooth cut surface is also achieved. A further not unimportant feature is, that the opposed movement of the saw teeths 7, 8 in relation to each other also removes the risk for the workpiece 6 being moved in the direction of the saw blade 1, 2 or the saw wheel 3, 4, which normally is a substantial risk for injuries when using conventional saws, including only one saw blade or saw wheel.

Figure 4:
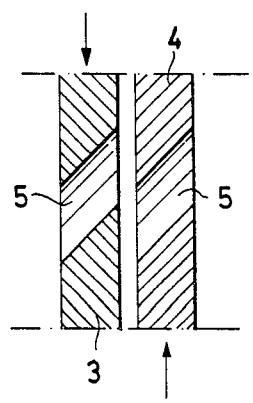
FIG. 4 shows a cross-sectional view IV—IV of part of the saw wheels shown in FIG. 2.

When utilizing revolving saw wheels 3, 4, the saw wheels 3, 4 should be located in a very adjacent position to each other, and this results obviously in a risk for contact against each other between the in opposite direction rotating saw teeths 7, 8. By arranging the saw wheels 3, 4 with peripherally located through holes 5, a pump or fan action is achieved, whereby air streams are supplied at a pressure exceeding atmospheric pressure to the clearance between the saw wheels 3, 4, thus forming an intermediately located air cushion with increased air pressure, forcing the peripheral portions of the saw wheels 3, 4 in direction from each other, and preventing contact between same. Such holes 5 may either be arranged as in relation to the plane of the saw wheels 3, 4 perpendicularly extending through holes, or said pump or fan action may be further increased by arranging the holes 5 inclined in relation to said planes, as shown in FIG. 4. By arranging the holes 5 inclined in relation to the rotary direction, a sharp edge portion results, guiding the surrounding air into the clearance between the saw wheels 3, 4, thereby facilitating a further increased pressure with regard to the intermediately located air cushion.

An interesting effect caused by the aforementioned air cushion is also, that it acts as an oscillating preventing factor for the saw wheels 3, 4, which further improves the sawing result achieved, and also reduces the sound level when sawing.

Practical experiments involving two saw wheels 3, 4 revolving in opposite directions to each other have shown it possible to cut thin-walled tubes and profiles having a wall thickness of less than 0,1 mm without noticable deformation, and as an example of the results achieved can be mentioned, that a beer can may for example be held by the operator, and cut without any throws, and with a cut surface free from burrs and deformations. To perform a corresponding operation, and to achieve a corresponding result, is obviously impossible using conventional circular saws.

FIG. 5 shows a first example of how two saw wheels 3, 4 can be arranged supported by two drive shafts 9, 10 rotating in opposite directions to each other, a first drive shaft 9 being arranged with a guiding stud, rotatably supported in a bearing 11 adjacent to the end portion of the second drive shaft 10. The purpose of said guiding stud is to secure that a common rotary axle is maintained for the drive shafts 9, 10, but for certain applications, guidance of the drive shafts 9, 10 in relation to each other is not required.

It is further shown how the first drive shaft 9 can be arranged with a centrally located channel 12, having an outlet in the clearance between the saw wheels 3, 4. The purpose of said channel 12 is to facilitate supply of a lubricating or cooling agent, which is thrown out centrally between the in opposite directions to each other revolving saw wheels 3, 4. This results in a considerably improved lubricating and cooling effect in relation to conventional techniques as used today, i.e. supply of a lubricating or cooling agent through a nozzle located adjacent to the peripheral point where the sawing operation is performed. When supplying such an agent between two in opposite directions to each other rotating saw wheels 3, 4, the agent receives an often desirable mixing operation during the transfer of same between the in opposed directions to each other rotating saw wheels 3, 4 towards the peripheral part of same. It is also possible to supply such an agent in large volumes, and with such high pressure, that it will replace the previously mentioned air cushion in the clearance between the saw wheels 3, 4. Hereby are the peripheral portions of the saw wheels maintained separated by means of hydraulical pressure.

An alternative embodiment is shown in FIG. 6, intended to facilitate driving a first and a second drive shaft, 9 and 10 respectively, from one and the same side in relation to the saw wheels 3, 4. A first drive shaft 9 is arranged embraced by a second drive shaft 10, obviously preferably having suitable bearing means (not shown) in an intermediate position, thus reducing existing friction. As described with reference to the first embodiment, the first drive shaft 8 may obviously be arranged with a channel 12, intended to facilitate supply of a lubricating or cooling agent.

Finally, FIG. 7 is intended to show an example of how a band saw can be arranged, in order to facilitate use of twin saw blades 1, 2, and without substantially changing the conventional design of a band saw. According to this embodiment, a first saw blade 1 is arranged supported by two from each other spaced supporting wheels 13, 13', which revolve in a first rotary direction, while two supporting wheels 14, 14' having a larger distace between the rotary centers, and a slightly larger diameter, support a second saw blade 2, driven in opposite direction to the first saw blade 1. However, since also other embodiments may be used, e.g. with the supporting wheels, 13, 13' and 14, 14' respectively, having substantially equal distance between the rotary centers but being displaced in a side relationship to each other, the shown embodiment is only intended to serve as an example of how a band saw can be designed, in order to be utilized in accordance with the invention. It is also obvious, that a band saw advantageously should include suitable adjustable guiding means for the saw blades 1, 2 (not shown), whereby the internal distance can be adjusted to a suitable clearance.

When using revolving saw wheels 3, 4, the present invention also results in the advantage that sawing can be performed with any desired feeding direction of the work piece 6 in relation to the saw wheels 3, 4, in difference to a conventional circular saw, facilitating sawing in only one feeding direction. As a result, a number of sawing operations can be performed in a simplified and more rapid fashion with a circular saw according to the present invention, since, for example, cutting of strips can be performed as a movement of the workpiece 6 in a first direction past the saw wheels 3, 4, whereby a first sawing operation is performed, but also a return movement of the workpiece 6 in a second direction can be used to perform a sawing operation, in difference to previously known circular saws, where a return movement is performed as a lifting operation above the saw wheel. When sawing plateshaped workpieces 6, e.g. using a portable circular saw, the saw can also operate in desired direction, which often results in advantages. The present invention can also advantageously be applied for clearance saws of the type including a rotary saw wheel, since previously existing risks for injuries caused by "throws" of the saw wheel now can be completely eliminated.

For certain applications, e.g. when sawing profiles or tubes with the saw cut inclined in relation to the longitudinal direction of extension, it may also be advantageous to drive the saw blades 1, 2 or the saw wheels 3, 4 with different speed in relation to each other, in order to cause adaption to the quantity of goods to be removed by each of the saw blades 1, 2 or the saw wheels 3, 4, and to optimize the quality of the saw cut.

As previously mentioned, the present invention offers a solution to previously known problems when cutting thin materials, and particularly thin profiles and tubes. However, also with regard to other types of workpieces 6, the invention offers substantial advantages, and it is thus in no way restricted to a certain type of workpieces 6. Furthermore, described and shown examples of embodiments are only intended to simplify the understanding of the invention, since the invention obviously can be further modified within the scope of the inventive thought and the following claims.

I claim:

1. A method of sawing which comprises providing a pair of saw elements having saw teeth disposed respectively in adjacent planes and in opposite cutting directions, continuously moving the saw elements in opposite directions corresponding to the cutting directions of the respective teeth to form a saw cut in a work piece, and maintaining a space between operative edge portions of the elements containing the saw teeth by providing fluid pressure exceeding atmospheric between the elements.

2. The method of claim 1 wherein the fluid pressure is provided by forming an air cushion between the elements.

3. The method of claim 2 wherein the air cushion is formed by air flowing through the elements as they move.

4. The method of claim 1 wherein the fluid pressure is provided by supplying a liquid medium between the elements.

5. The method of claim 1 wherein the elements are saw blades.

6. The method of claim 1 wherein the elements are saw wheels.

7. The method of claim 1 wherein the elements are moved at different speeds respectively.

8. Sawing apparatus comprising a pair of saw elements having saw teeth disposed respectively in adjacent planes and in opposite cutting directions, means for continuously moving the saw elements in opposite directions corresponding to the cutting directions of the teeth so as to form a saw cut in the work piece, and means for providing fluid pressure exceeding atmospheric pressure between the elements during sawing to maintain a space between edge portions of the elements containing the saw teeth.

9. Apparatus as defined in claim 8 wherein said means for providing fluid pressure comprises a coolant flow passage with an outlet disposed between the saw elements.

10. Apparatus as defined in claim 8 wherein the means for providing fluid pressure comprises openings formed through the respective elements for inducing air flow therethrough when the elements are moved, to form an air cushion therebetween.

11. Apparatus as defined in claim 10 wherein the openings are inclined with respect to the directions of movement of the saw elements.

12. Apparatus as defined in claim 8 wherein the elements are saw blades.

13. Apparatus as defined in claim 8 wherein the elements are saw wheels.

* * * * *